(12) United States Patent
Wagner

(10) Patent No.: US 6,260,905 B1
(45) Date of Patent: Jul. 17, 2001

(54) MULTI-SEGMENT, VERTICALLY OPERABLE, REAR VEHICLE WINDOW

(76) Inventor: Michael T. Wagner, 483 Amboy Ave., Cliffwood Beach, NJ (US) 07735

( * ) Notice: Subject to any disclaimer, the term of this patent is extended or adjusted under 35 U.S.C. 154(b) by 0 days.

(21) Appl. No.: 09/477,609

(22) Filed: Jan. 4, 2000

(51) Int. Cl.[7] .................................................. B60J 1/18
(52) U.S. Cl. ........................ 296/146.16; 49/374; 49/349
(58) Field of Search ..................... 296/146.16, 146.15, 296/190.1, 24.1, 149; 49/374, 349, 348

(56) References Cited

U.S. PATENT DOCUMENTS

| | | | |
|---|---|---|---|
| 3,339,665 | * | 9/1967 | Johnstone et al. .................. 180/289 |
| 3,566,540 | * | 3/1971 | Hewitt .................................. 49/417 |
| 4,015,875 | * | 4/1977 | Setina .................................. 296/24.1 |
| 4,119,341 | * | 10/1978 | Cook .................................. 296/146.16 |
| 4,249,771 | * | 2/1981 | Gergoe et al. ...................... 296/146.16 |
| 4,793,099 | * | 12/1988 | Friese et al. ........................ 49/380 |
| 6,006,473 | * | 12/1999 | Mariel et al. ...................... 49/139 |
| 6,052,947 | * | 4/2000 | Smith .................................. 49/352 |
| 6,073,395 | * | 6/2000 | Fenelon ............................... 49/358 |
| 6,125,587 | * | 10/2000 | Woods ................................. 49/374 |

\* cited by examiner

Primary Examiner—Stephen T. Gordon
Assistant Examiner—Patricia Engle
(74) Attorney, Agent, or Firm—Charles I. Brodsky

(57) ABSTRACT

A multi-segment rear power window assembly for location behind the seats of a pick-up truck, van, tractor trailers, limousines and the like, having the ability to independently open and close one or several movable sections in a vertical direction, the same or differing amounts, from a position inside the cab of the vehicle.

10 Claims, 5 Drawing Sheets

MULTI-SEGMENT, VERTICALLY OPERABLE, REAR VEHICLE WINDOW

BACKGROUND OF THE INVENTION

1. Field of the Invention

This invention relates to automotive rear windows, in general, and to multi-segment automotive windows typically located behind the seats of a pick-up truck, in particular.

2. Description of the Related Art

As is well known and understood, pick-up trucks, unlike passenger cars, are designed with an openable rear window to permit better visibility and air flow—and an ability to communicate with persons at the rear of the truck or inside a shell mounted on the truck bed. Typically, the configuration of such a rear window is a single panel which opens in a vertical plane, a three section panel which the center panel is movable in a horizontal plane, or a four section panel in which the two center panels can be slid horizontally apart in opposite directions. Several problems arise when using each of these kinds of windows due, in part, to the aerodynamic issues raised by having a flat aspect to the vehicle's cab—more specifically, noise, the buffeting of air and airborne particulate into the cab, intrusion of inclimate weather, and safety risk to the passengers inside.

For example, in the three and four section window arrangement where the center panels slide horizontally, an opening is immediately created which extends some twelve (12) to eighteen (18) inches between the roof of the cab and the top of the rear seat. Passengers located near this opening—no matter how small the opening is—are thus subjected to the direct flow of wind gusts, smoke, dust, and rain onto the top and back of their heads, neck and shoulders. As the window opening is widened, the center passenger seat often becomes unusable or unbearable at the very least. In addition, the center passenger seat usually does not have a headrest, thereby exposing the center seat passenger to serious injury if his or her head contacts the hard vertical edge of the metal frame defining the open window. This is especially the case with the multi-segment windows of those vehicles used in rough, off-road situations which bounce the passengers about, inside the vehicle.

Various power controlled multi-segment window designs which move in a horizontal plane have been disclosed in patents such as U.S. Pat. No. 4,671,013/Friese; U.S. Pat. No. 4,920,698/Friese; U.S. Pat. No. 5,146,712/Hlavaty; U.S. Pat. No. 5,613,323/Buening; and U.S. Pat. No. 5,669,181/Kollar. In a single panel window which opens in a vertical plane (e.g. U.S. Pat. No. 4,119,341/Cook),—the costs are great—due to the inclusion of a large, optically distortion-free piece of glass, heavy duty tracks, weatherstripping, and large lift motors. When a window is segmented, on the other hand, each piece can be thinner, and lighter, and less likely to contain distortions. Additionally, when a user wants to operate a single panel window, it is an all, or nothing choice, with all seating positions being then subjected to the exposure to the outside elements created by the opening. If an operator, for example, desires to have an object—such as a long pole or a piece of lumber—extend into the cab from the outside, the entire rear window would have to be lowered, leaving absolutely no protection to the occupants to the outside elements. Having the entire window lowered will also be seen to affect the stability of the vehicle at highway speeds, as wind then buffets through the vehicle.

SUMMARY OF THE INVENTION

As will become clear from the following description, a three section window where the center panel opens on a vertical plane, or a four section window where the two center sections likewise open in a vertical plane, represent preferred embodiments of the invention. As will be seen, this configuration operates with either a mechanical hand-crank type mechanism, or using a preferred powered means to open and close the window sections.

Thus, and in accordance with the invention, the occupants of the vehicle have a variety of opening possibilities that permit the most desirable combination of access, ventilation, protection, and comfort.

In accordance with the preferred embodiment set forth, a power switch would be located on the dashboard of the vehicle having a separate control for each movable window section. These switches would control small motors located within the rear wall of the cab, having continuously variable stop points, which lower and raise the window sections independently. In this manner, it is possible to have infinite combinations of raised and lowered window segments positioned to provide the desired effect.

BRIEF DESCRIPTION OF THE DRAWINGS

These and other features of the invention will be more clearly understood from a consideration of the following description, taken in connection with the accompanying drawings, in which.

DETAILED DESCRIPTION OF THE INVENTION

Figure 1:
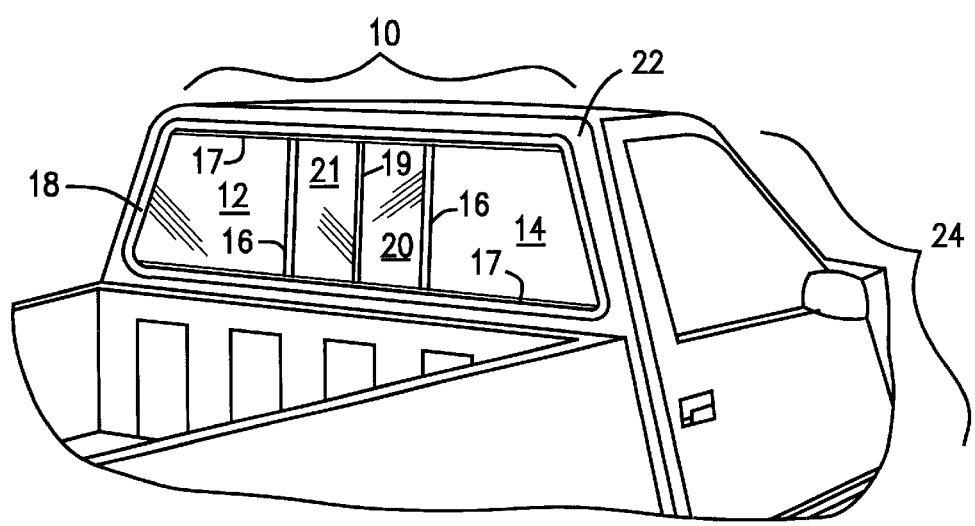
FIGS. 1–3 are fragmentary perspective views of the rear portion of a pick-up truck cab showing a four-segment rear window in various positions.

Referring to the drawings, the multi-segment vertically operable rear vehicle window is shown at 10, as including a pair of fixed window segments 12, 14, a pair of weather strip tracks 16 affixed to their facing edges and with a third weather stripped track 17 which secures with the window frame 18. The weather strip tracks 16 and 17 are preferably composed of an aluminum alloy coated with rubber to create a rigid support, an environmental seal, and a cushioned edge. A pair of moveable window segments 20, 21 slide up and down within the weather strip tracks 16, with a fourth weather strip track 19 affixed to an inside edge of one of the moveable segments 20, 21 so as to both support and seal the seam between the two segments 20, 21 when they are in the raised position. In each of FIGS. 1–6, all window segments are aligned in the same horizontal plane from side-to-side.

Figure 5:
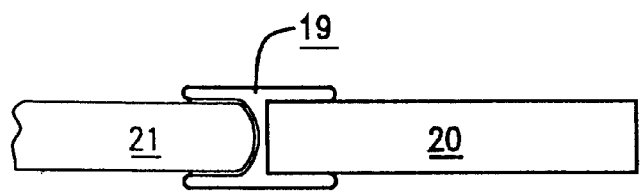
FIG. 5 is a top cut-away view showing a weather striping track affixed to one glass segment and aligned with a second glass segment.

As more clearly shown in FIG. 5, the weather strip track 19 is attached to one of the moveable window segments 20, 21, with the other moveable window segment being able to securely slide within the weather strip track 16, while maintaining lateral support with the weather strip 16 and while still substantially flush across a horizontal plane. In FIG. 5, the weather strip track 19 is secured to window segment 20.

Figure 4:
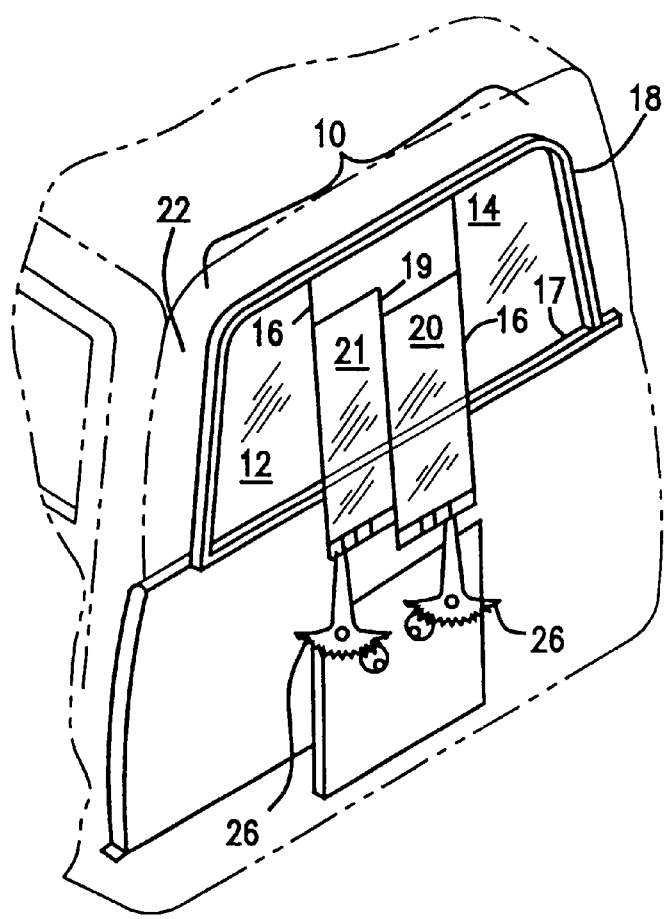
FIG. 4 is a fragmentary isometric view of the rear portion of a truck cab, along with phantom lines showing the workings of its movable window lifts.
Figure 6:
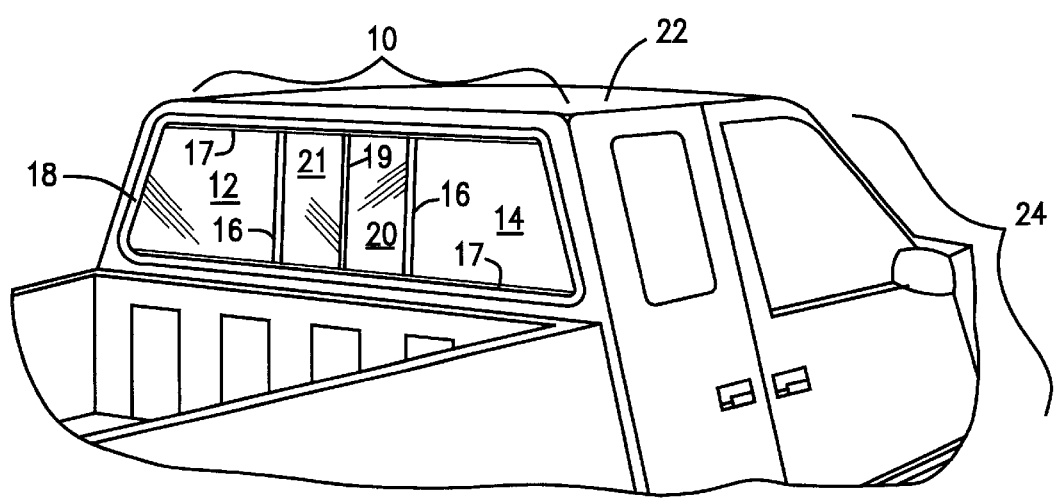
FIG. 6 is perspective view of the rear portion of a pick-up truck having a cab-and-a-half option, showing a four segment rear window.

FIG. 4 shows the mechanical workings of the invention understood to be sandwiched within the rear wall 22 of the truck cab 24 (FIG. 6). Each moveable window segment 20, 21 has its own individually addressable motor 26, which raises and lowers the moveable window segment within the weather strip tracks 16, with continuously variable stopping positions within the window's range of motion. Such motor can be of a gear lever, screw drive or any other variety which pushes the window in an upward direction, and supports the window's weight when in a quiescent state.

Figure 2:
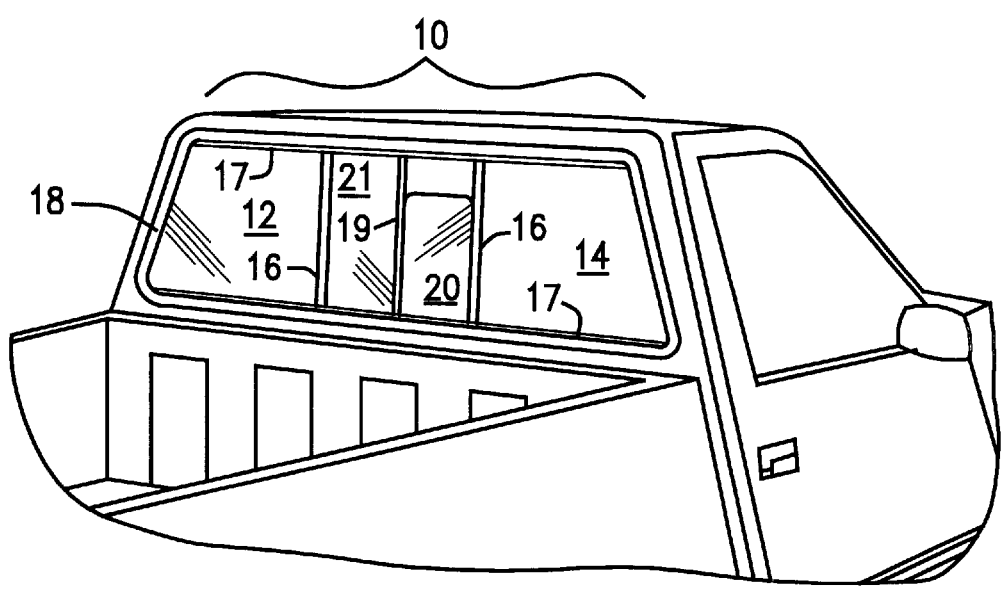
Figure 3:
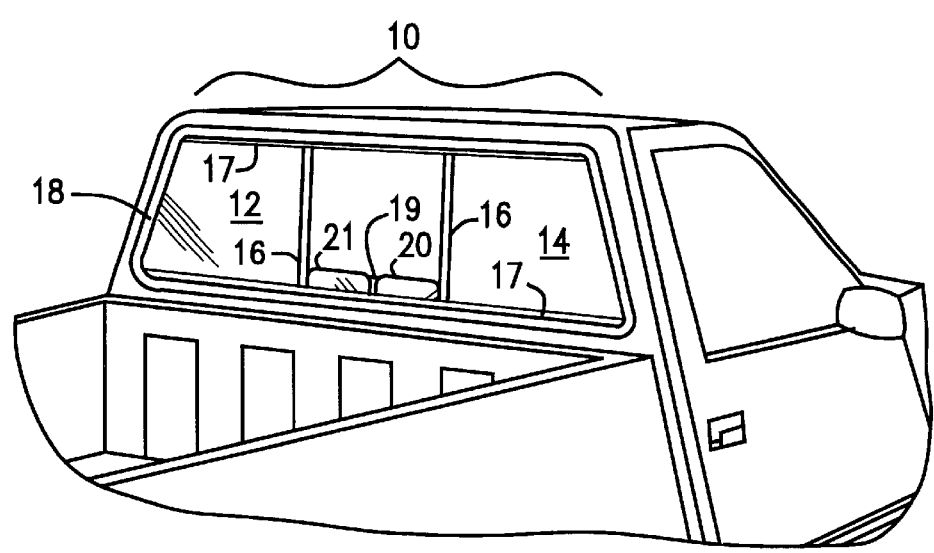

FIGS. 2 and 3 are helpful in understanding operating ranges and independence of the moveable window segments 20, 21. FIG. 2 more specifically shows the driver's side moveable window segment 21 in the full upright position, while the passenger's side moveable window segment 20 is only open some twenty-five percent. FIG. 3 shows what the rear of the truck cab 24 would look like when both moveable window segments 20, 21 are in the lowered position. This view is also how the truck cab 24 would basically appear if a three segment window were employed, merely removing one of the motors 26, and the weather strip track 19 that was attached between the two moveable window segments 20, 21. As will be appreciated, the three segment window configuration would give less flexibility to the user, but would simplify the mechanics and parts needed.

While there have been described what are considered to be preferred embodiments of the present invention, it will be readily appreciated by those skilled in the art that modifications can be made without departing from the scope of the teachings herein—as, for example, utilizing a mechanical lift employing a traditional window crank instead of the motorized lift described in FIG. 4, although this would impair the users ability to open the window while driving. Similarly, whereas the invention is described in terms of its use in a pick-up truck, the same may be employed in other vehicles such as vans, tractor trailers, limousines, cab-and-a-halfs (See FIG. 6), etc. For at least such reasons, therefore, resort should be had to the claims appended hereto for a true understanding of the scope of the invention.

What is claimed is:

1. In a rear cab compartment of an automotive vehicle, a combination comprising: a window frame; a window assembly within said frame; said window assembly including a plurality of window segments aligned in the same vertical plane from side-to-side, two of which are fixed window segments with a rigid weather strip track on one edge of each of the fixed window segment is wherein the rigid weather strip tracks are facing one another, and at least one of which is a moveable window segment which is moveable upwardly and downwardly within said facing weather strip tracks; and means for raising and lowering said moveable window segment while maintaining all window segments substantially flush across said vertical plane.

2. The combination of claim 1 wherein said means for raising and lowering said moveable window segment is a motorized lift.

3. The combination of claim 2 wherein said means is situation in the front compartment of an automotive vehicle.

4. The combination of claim 1 wherein said means for raising and lowering said moveable window segment is a mechanical lift.

5. The combination of claim 1 wherein said weather strip tracks are affixed to support and seal all seams between said fixed and said at least one moveable window segments.

6. The combination of claim 5 wherein said means is operable to lower said moveable window segments so as to be completely out of view of an operator of the vehicle.

7. The combination of claim 1, wherein said at least one moveable window segment further includes a second moveable window segment for raising and lowering vertically within facing weather strip tracks, and wherein said means raises and lowers said two moveable window segments independent of each other while continuing to maintain all window segments substantially flush in a vertical plane.

8. The Combination of claim 7 wherein said two moveable window segments are situated adjacent one another between said two fixed window segments.

9. The Combination of claim 8 also including a rigid weather strip track between said two moveable window segments to support and seal a seam formed between said two moveable window segments when raised and lowered.

10. The Combination of claim 7 wherein said means is operable to lower either or both of said two moveable window segments so as to be completely out of view of an operator of said automotive vehicle.

* * * * *